(12) United States Patent
Sims

(10) Patent No.: US 10,094,634 B2
(45) Date of Patent: Oct. 9, 2018

(54) DRY FIRE TRIGGER DEVICE

(71) Applicant: David Sims, Friendsville, TN (US)

(72) Inventor: David Sims, Friendsville, TN (US)

( * ) Notice: Subject to any disclaimer, the term of this patent is extended or adjusted under 35 U.S.C. 154(b) by 485 days.

(21) Appl. No.: 14/686,848

(22) Filed: Apr. 15, 2015

(65) Prior Publication Data

US 2015/0300766 A1 Oct. 22, 2015

Related U.S. Application Data

(60) Provisional application No. 62/013,051, filed on Jun. 17, 2014, provisional application No. 61/980,220, filed on Apr. 16, 2014.

(51) Int. Cl.
| | |
|---|---|
| *G09B 19/00* | (2006.01) |
| *F41A 33/00* | (2006.01) |
| *F41G 3/26* | (2006.01) |
| *A63F 9/02* | (2006.01) |
| *G09B 9/00* | (2006.01) |
| *F41A 21/26* | (2006.01) |

(52) U.S. Cl.
CPC ............ *F41A 33/00* (2013.01); *A63F 9/02* (2013.01); *F41A 21/26* (2013.01); *F41G 3/26* (2013.01); *G09B 9/00* (2013.01); *G09B 9/003* (2013.01); *G09B 19/00* (2013.01)

(58) Field of Classification Search
None
See application file for complete search history.

(56) References Cited

U.S. PATENT DOCUMENTS

| 5,680,724 A | 10/1997 | Peterken | |
|---|---|---|---|
| 7,581,954 B2 | 9/2009 | Schavone | |
| 7,753,679 B1 | 7/2010 | Schuetz | |
| 8,602,785 B2 | 12/2013 | Jensen et al. | |
| 9,803,948 B2 * | 10/2017 | Liao | F41A 33/00 |
| 2014/0193778 A1 * | 7/2014 | Seigler | F41A 33/00 434/16 |
| 2015/0013201 A1 * | 1/2015 | Hannan | F41A 33/00 42/20 |
| 2015/0198404 A1 * | 7/2015 | Campbell | F41A 35/00 42/70.11 |
| 2015/0211823 A1 * | 7/2015 | Swensen | F41A 19/12 42/69.01 |
| 2016/0258706 A1 * | 9/2016 | Ollig | F41A 33/00 |
| 2017/0146311 A1 * | 5/2017 | Tucker | F41A 17/74 |

* cited by examiner

*Primary Examiner* — James Hull
(74) *Attorney, Agent, or Firm* — Matthew M. Googe; Robinson IP Law, PLLC

(57) ABSTRACT

A dry fire trigger device for dry firing a lower receiver of a firearm having a magazine well, a trigger, and a hammer, the dry fire trigger device comprising is provided. The dry fire trigger device includes a lever housing shaped to engage the magazine well of the lower receiver and a lever movably secured to the lever housing. The lever includes a hammer contact portion shaped to contact the hammer of the lower receiver. The hammer contact portion is adjacent the hammer of the lower receiver when the device is secured in the magazine well of the firearm. In a first position the hammer contacts the hammer contact portion of the lever when the trigger is pulled and further wherein the movable lever substantially re-cocks the hammer after the hammer contacts the lever when the lever is moved to a second position.

12 Claims, 16 Drawing Sheets

US 10,094,634 B2

DRY FIRE TRIGGER DEVICE

CROSS-REFERENCE TO RELATED APPLICATIONS

This application claims priority to now U.S. Application Ser. No. 61/980,220 to David Sims entitled "Dry Fire Trigger Device" which was filed on Apr. 16, 2014, and now U.S. Application Ser. No. 62/013,051 to David Sims entitled "Motorized Dry Fire Trigger Device" which was filed on Jun. 17, 2014, the contents of which are incorporated herein by reference in their entirety.

FIELD

This disclosure relates to the field of firearm accessories. More particularly, this disclosure relates to a dry fire device for allowing a lower receiver of a firearm to be dry fired without damaging the firearm.

BACKGROUND

Various firearms such as AR 15 rifles may be "fired" without ammunition such that a hammer of the firearm is released, a practice commonly referred to as "dry firing." While dry firing may not damage the firearm in some situations, such as when the firearm is completely assembled with both an upper receiver and a lower receiver, dry firing is generally not recommended when the upper receiver is not installed to avoid damaging components of the lower receiver such as the hammer or a bolt catch of the lower receiver.

While some devices allow firearms to be dry fired, these devices typically require that the upper receiver be installed when dry firing the firearm. Further, other devices require that a user of the firearm have a hand free to subsequently return the hammer to a cocked position such that the firearm may be subsequently dry fired, a process that the user must repeat for each time that the user desires to dry fire the firearm. This may require substantial movement of the user which may result in loss of sightline and other disruption of the process of dry firing the weapon. Additionally, it may be desirable to be able to rapidly return the hammer to a cocked position so that the firearm may be subsequently dry fired, such as when dry firing an automatic weapon.

For example, U.S. Pat. No. 5,680,724 describes a cylindrical insert placed within a bolt carrier of a rifle or firearm. However, the cylindrical insert is not configured for dry-firing the lower receiver without the upper receiver. Further, a user must lift off of the lower receiver to move the bolt carrier to reset the firearm for dry firing. U.S. Patent Publication No. 2015/0013201 describes a rifle lower receiver configured for dry fire training. However, the device of the '201 Publication is a substantial replica of a host weapon's lower receiver or requires substantial modification of a weapon's lower receiver.

What is needed, therefore, is a dry fire device that allows a firearm to be dry fired without the upper receiver installed, and that further allows a user to re-cock a hammer of the lower receiver without having to remove a hand from the firearm such that the firearm may be repeatedly dry fired.

SUMMARY

The above and other needs are met by a dry fire device for allowing a lower receiver of a firearm to be dry fired without damaging the firearm, the lower receiver having a magazine well, a trigger, and a hammer. The dry fire trigger device includes a lever housing shaped to engage the magazine well of the lower receiver and a lever movably secured to the lever housing. The lever includes a hammer contact portion shaped to contact the hammer of the lower receiver. The hammer contact portion is adjacent the hammer of the lower receiver when the device is secured in the magazine well of the firearm. In a first position the hammer contacts the hammer contact portion of the lever when the trigger is pulled and further wherein the movable lever substantially re-cocks the hammer after the hammer contacts the lever when the lever is moved to a second position.

In one embodiment, the lever further includes a lower reset portion, the lower reset portion positioned adjacent the trigger of the lower receiver when the dry fire trigger device is secured in the magazine well of the firearm. In another embodiment, the lever is pivotally attached to the lever housing at a pivot projection of the housing such that the lever pivots with respect to the housing.

In yet another embodiment, the dry fire trigger device further includes a spring attached at a first end to the lever housing and at a second end to the lever such that the spring urges the lever to the first position such that the lever returns to the first position after substantially re-cocking the hammer of the lower receiver.

In one embodiment, the hammer contact portion of the lever further includes a bolt catch notch formed therein. In another embodiment, the lever housing further includes a magazine release notch for engaging a magazine release of the lower receiver. In yet another embodiment, the lever housing and lever are formed of a hardened polymer. In another embodiment, the lever housing is formed of a first block half and a second block half.

In another aspect, a dry fire trigger device for a lower receiver including a magazine well, a trigger, and a hammer is provided. The dry fire trigger device includes a lever housing shaped to engage the magazine well of the lower receiver, a lever pivotally secured to the lever housing, and a spring attached at a first end to the lever housing and at a second end to the lever. The lever includes a hammer contact portion shaped to contact the hammer of the lower receiver, a lower reset portion positioned adjacent the trigger of the lower receiver when the dry fire trigger device is secured in the magazine well of the firearm, and a bolt catch notch formed in the hammer contact portion of the lever. The spring urges the lever to the first position such that the lever returns to the first position after substantially re-cocking the hammer of the lower receiver. The hammer contact portion is adjacent the hammer of the lower receiver when the device is secured in the magazine well of the firearm. In a first position the hammer contacts the hammer contact portion of the lever when the trigger is pulled and further wherein the movable lever substantially re-cocks the hammer after the hammer contacts the lever when the lever is moved to a second position.

In yet another aspect, a dry fire trigger device for dry firing a lower receiver of a firearm having a magazine well, a trigger, and a hammer is provided. The dry fire trigger device includes a lever housing shaped to engage the magazine well of the lower receiver, a lever movably secured to the lever housing, the lever including a hammer contact portion shaped to contact the hammer of the lower receiver, and a motor in mechanical communication with the lever. The hammer contact portion is adjacent the hammer of the lower receiver when the device is secured in the magazine well of the firearm. In a first position the hammer contacts the hammer contact portion of the lever when the trigger is pulled and further wherein the motor is activated to drive the movable lever to a second position such that the movable lever substantially re-cocks the hammer.

In one embodiment, the drive mechanism includes one or more drive gears in mechanical communication with the motor, a movable pushrod adjacent the one or more drive gears, the movable pushrod including a pushrod rack for engaging one of the one or more drive gears, and a slider attached at a first end to the pushrod and at a second end to the lever. The drive mechanism is configured to pivot the lever between the first position and the second position.

In another embodiment, the dry fire trigger device further includes a switch in electrical communication with the motor, the switch activates the motor when the hammer of the firearm contacts the lever. In yet another embodiment, one of the one or more drive gears is only partially surrounded by gear teeth along a circumference of the drive gear.

In one embodiment the dry fire trigger device further includes a spring attached at a first end to the lever housing and at a second end to the pushrod for urging the lever to return to the first position.

In another embodiment, the motor cycles the lever between the first position and the second position at a rate of from about 30 to about 300 cycles per minute. In yet another embodiment, a speed of the motor is adjustable such that a user may adjust a rate at which the motor cycles the lever between the first position and the second position.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

FIGS. 1-5 show a basic embodiment of a dry fire trigger device 10 including a lever 12 and a lever housing 14. The dry fire trigger device is configured to be secured to a lower receiver of a firearm such that the lever contacts a hammer of the lower receiver when a trigger is pulled and further configured to substantially re-cock the hammer after dry firing the firearm.

Figure 1A:
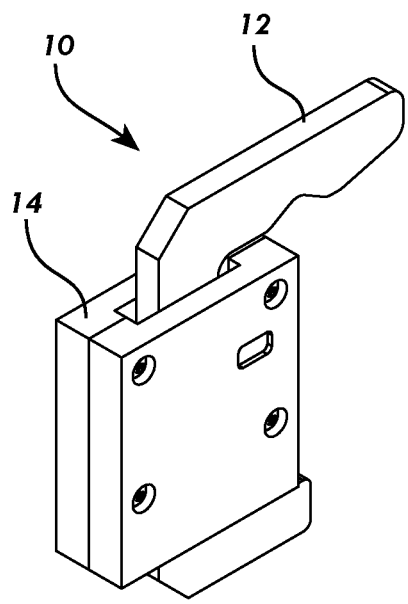
FIGS. 1A and 1B show a dry fire trigger device according to one embodiment of the present disclosure.
Figure 1B:
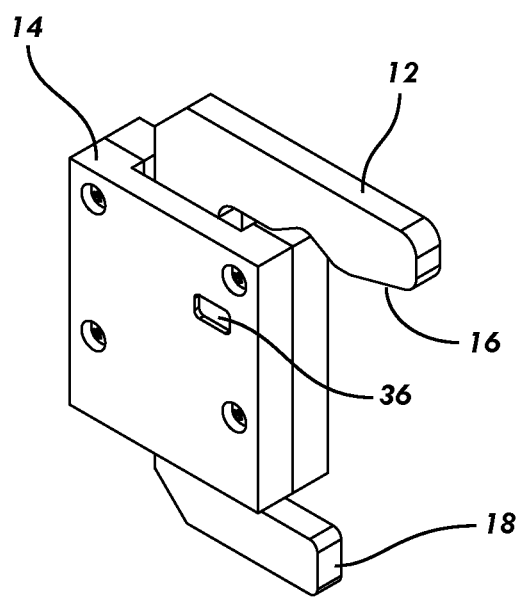
Figure 2A:
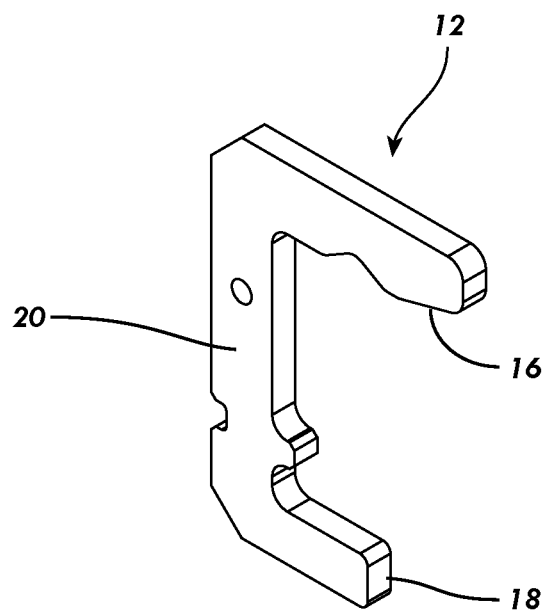
FIGS. 2A and 2B show a lever of a dry fire trigger device according to one embodiment of the present disclosure.
Figure 2B:
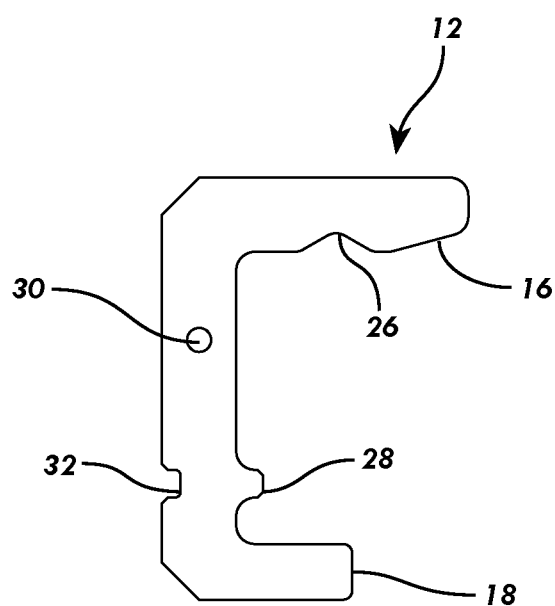

Referring to FIGS. 2A and 2B, the lever 12 includes an upper hammer contact portion 16, a lower reset portion 18, and a lever body 20 extending between the hammer contact portion 16 and the lower reset portion 18. The upper hammer contact portion 16 is shaped to substantially contact a hammer 22 of a lower receiver 24 (FIG. 6) of a firearm and includes a bolt catch notch 26 such that the lever 12 does not contact a bolt catch 27 of the lower receiver 24 when installed in the lower receiver 24.

A lever stop 28 is formed adjacent the lever body 20 and positioned such that the lever stop 28 contacts an interior surface of the lever housing 14. The lever 12 further includes a pivot bore 30 formed through the lever body 20. A lever spring notch 32 is formed in the lever body 20 for receiving a spring 34 (FIG. 5) positioned between the lever body 20 and the lever housing 14.

Figure 5:
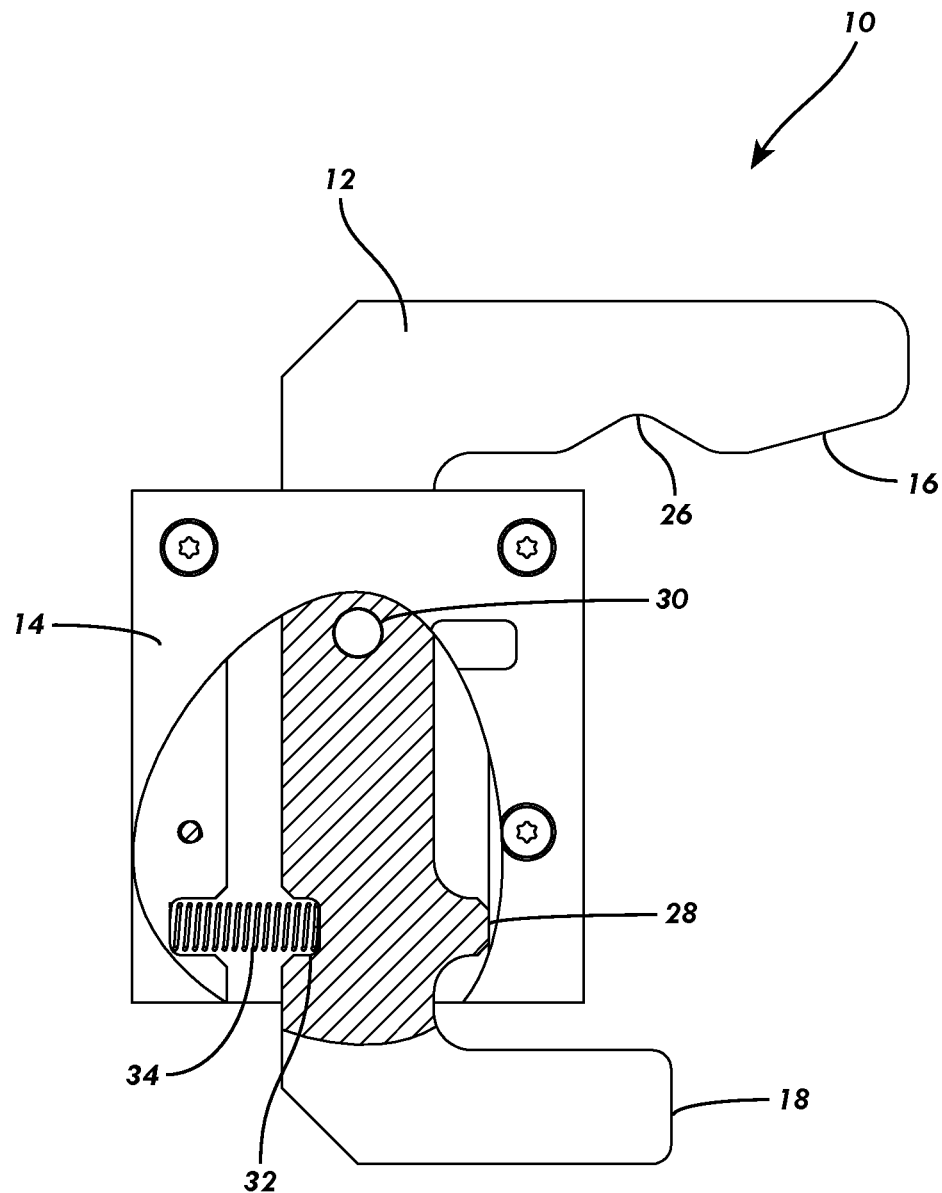
FIG. 5 shows a side view of a dry fire trigger device according to one embodiment of the present disclosure.
Figure 7A:
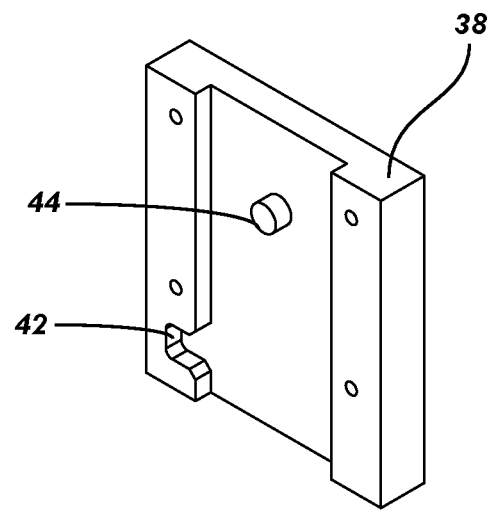
FIGS. 7A and 7B show a lever housing according to one embodiment of the present disclosure.
Figure 7B:
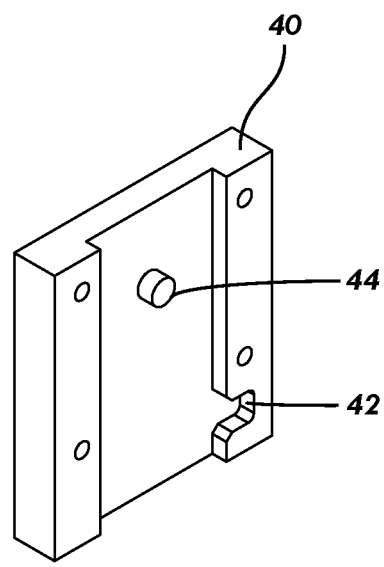

Referring again to FIG. 1A, the lever housing 14 includes a magazine release notch 36 formed in a side of the lever housing 14 for engaging a magazine release of a lower receiver 24. The housing 14 is formed of a first block half 38 and a second block half 40 (FIGS. 7A and 7B). The first and second block halves 38 and 40 include housing spring notch 42 for receiving the spring 34 between the housing spring notch 42 and the lever spring notch 32 as shown in FIG. 5. At least one of the first and second block halves 38 and 40 includes a pivot projection 44 for engaging the pivot bore 30 of the lever 12, thereby enabling the lever 12 to pivot about the pivot projection 44.

The lever housing 14 is sized and shaped to substantially slidably engage a magazine well 46 (FIG. 6) of the lower receiver 24. The lever 12 and housing 14 are preferably formed of a hard polymer material, such as a synthetic polymer. Preferably the lever 12 and housing 14 are formed of Delrin® brand polymer available from DuPont®. Other suitable materials may include, for example, other various polymers, metals, and other like solid materials.

Figure 3A:
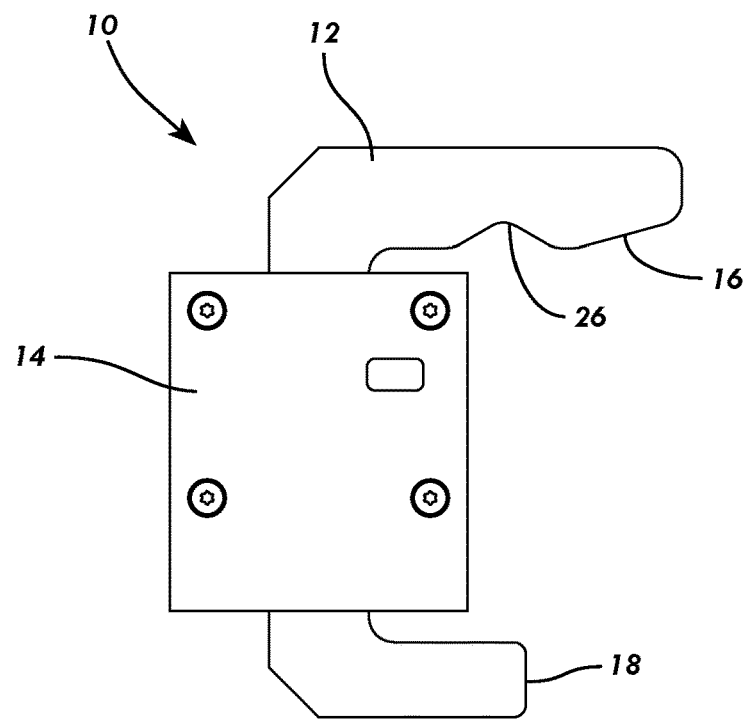
FIGS. 3A and 3B show a dry fire trigger device according to one embodiment of the present disclosure.
Figure 3B:
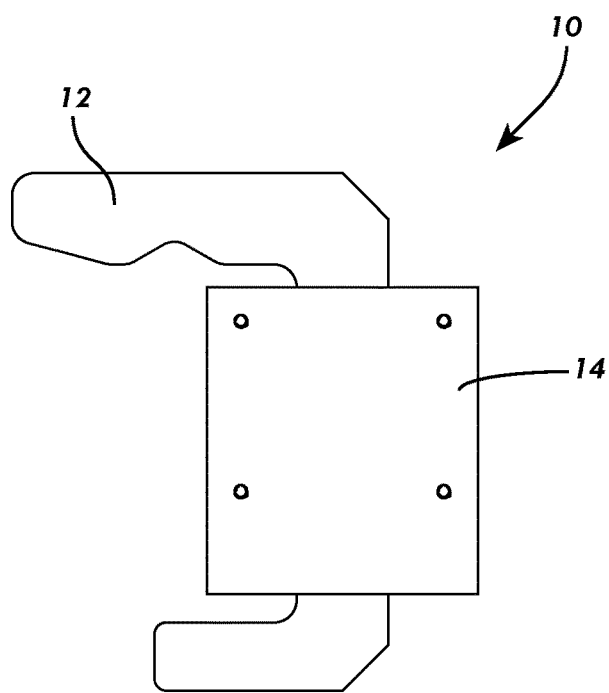
Figure 4A:
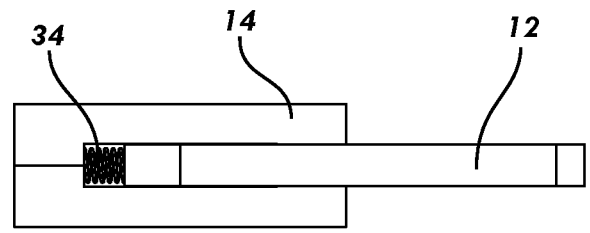
FIGS. 4A and 4B show a top and front view of a dry fire trigger device according to one embodiment of the present disclosure.
Figure 4B:
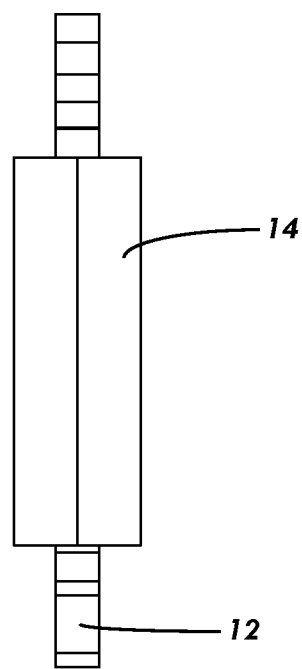

The lever housing 14 may be sized such that the lower reset portion 18 of the lever 12 extends from a lower portion of the housing 14, as illustrated in FIGS. 3A and 3B. Alternatively, the lever housing 14 may be substantially elongated such that a lower portion of the lever 12 is substantially contained within the housing 14 and the lower reset portion 18 of the lever 12 extends through an aperture 72 of the housing, as illustrated in FIGS. 17-20. The elongated lever housing 14 may be desirable wherein the housing 14 is to be used as a support for a user dry-firing a firearm, such as supporting the elongate housing 14 with a user's arm or resting the elongate housing 14 on another object. Further, the elongate housing 14 may simulate dry firing of a firearm with an extended magazine, such as a 20-round magazine, inserted into the magazine well 46 of the lower receiver 24.

Figure 8A:
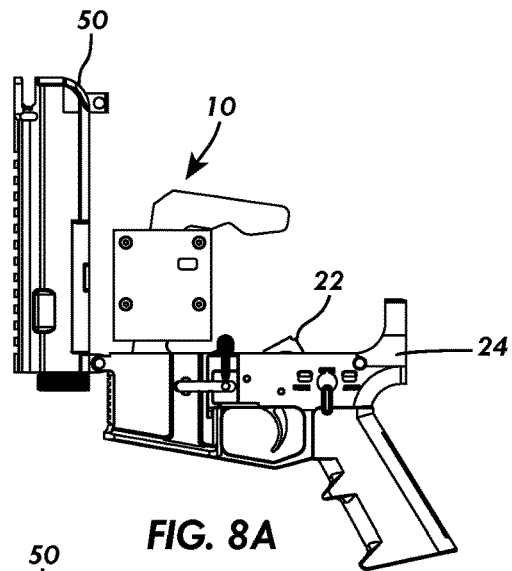
FIGS. 8A-8D show a dry fire trigger device installed on a lower receiver according to one embodiment of the present disclosure.
Figure 8B:
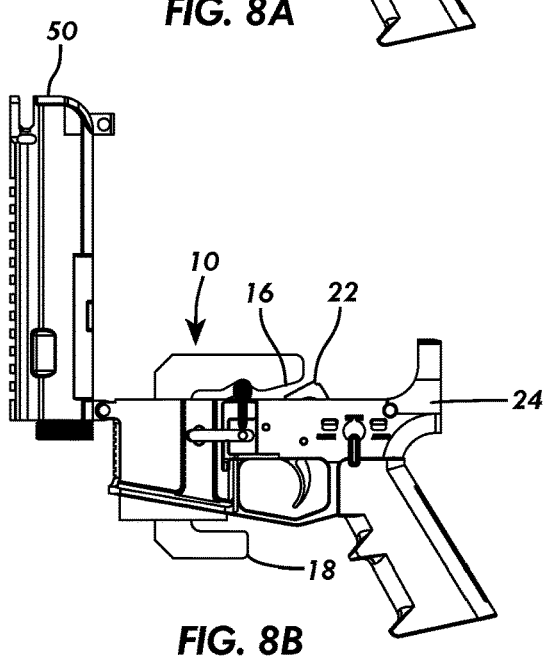

Referring now to FIGS. 8A-8D, the dry fire trigger device 10 is slidably inserted into the magazine well 46 of the lower receiver 24 such that the magazine release notch 36 engages a magazine release of the lower receiver 24. As shown in FIG. 8B, when the dry fire trigger device 10 is inserted into and engaged with the magazine well 46, the upper hammer contact portion 16 is positioned adjacent the hammer 22 of the lower receiver 24 when the hammer is in a cocked position. Further, the lower reset portion 18 is positioned adjacent a trigger 48 of the lower receiver 24 such that a user may easily remove a finger in contact with the trigger to engage the lower reset portion 18 of the dry fire trigger device 10.

Figure 8C:
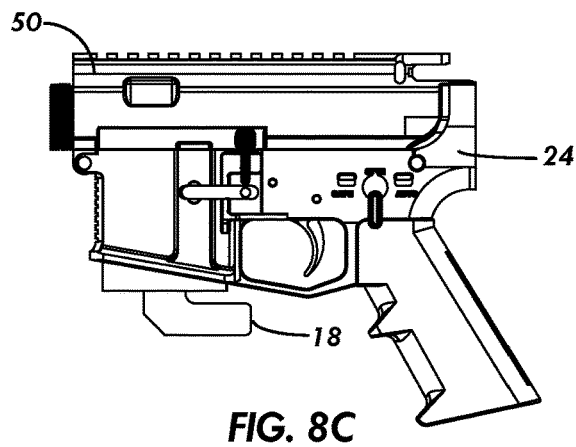
Figure 8D:
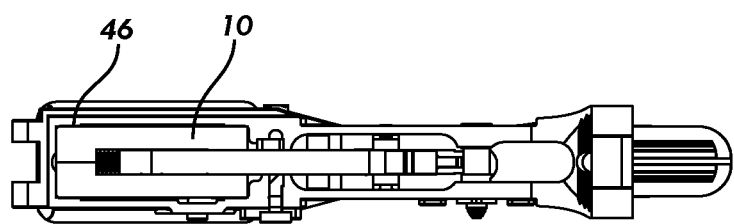
Figure 9A:
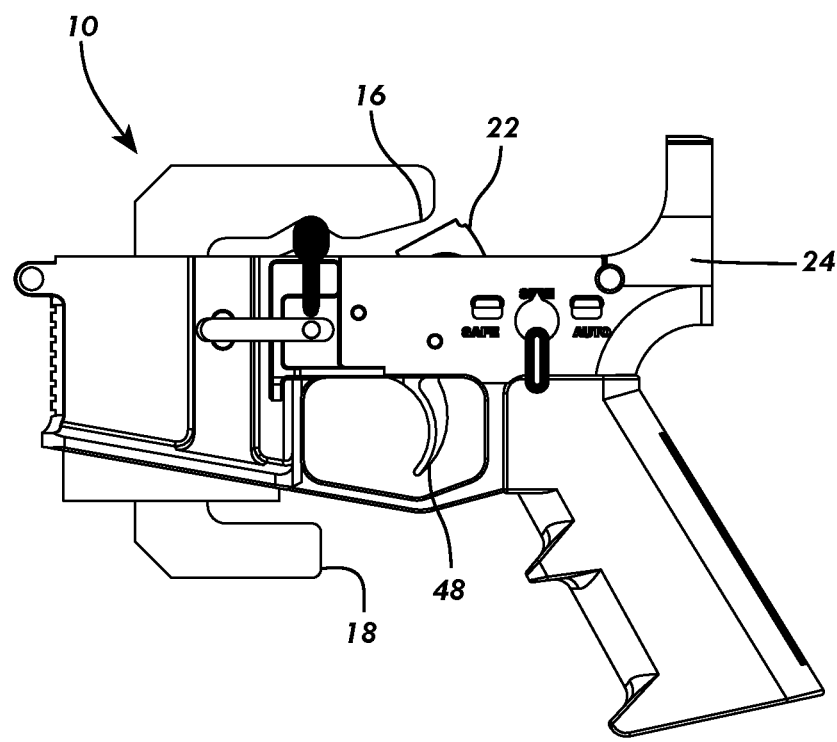
FIGS. 9A-9C show a dry fire trigger device installed on a lower receiver according to one embodiment of the present disclosure.
Figure 9B:
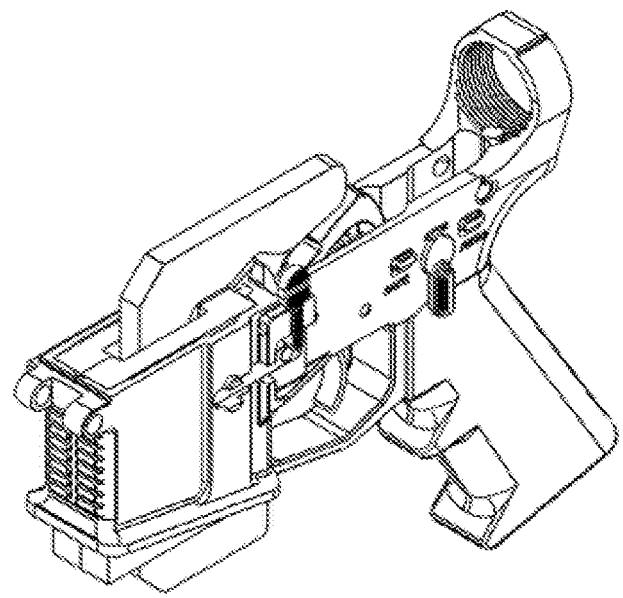
Figure 9C:
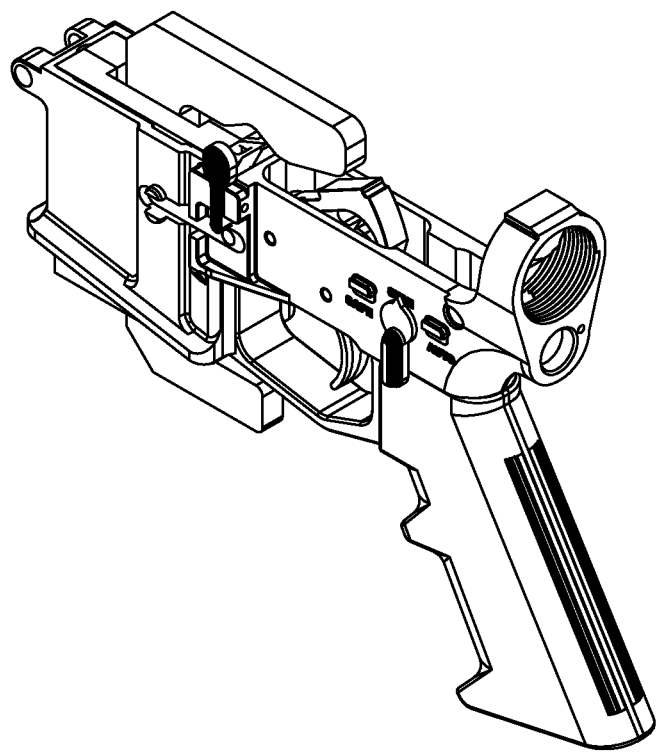

The dry fire trigger device 10 may be used either with the lower receiver 24 alone (FIG. 8), or with an upper receiver 50 installed such that the device 10 fits within the upper receiver 50 as shown in FIGS. 8A-8C. In one embodiment, the dry fire trigger device 10 further includes a chamber flag or other indicator attached to the device that visually indicates that the dry fire trigger device 10 is installed in the lower receiver 24 and that the firearm is therefore in a safe condition.

The dry fire trigger device 10 allows a user to dry fire the lower receiver 24 and subsequently quickly reset the hammer 22 of the lower receiver such that the lower receiver 24 may be dry fired again, thereby allowing a user to quickly and repetitively dry fire the lower receiver 24. As referred to herein, the term "dry fire" or "dry firing" refers to its commonly understood meaning of "firing" a firearm without ammunition, that is, to pull the trigger of a firearm and release the hammer of the firearm, often performed as practice for firing of the firearm.

Figure 10:
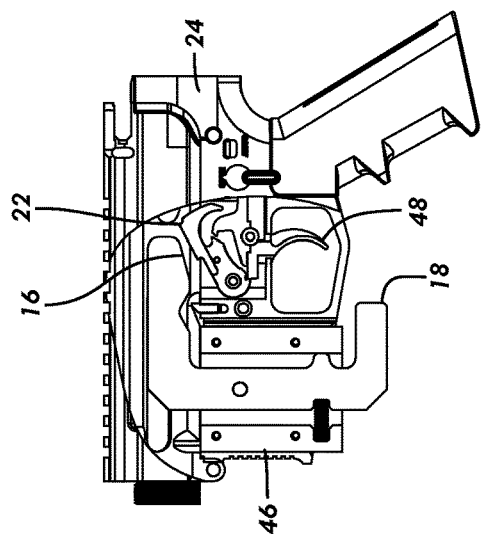
FIG. 10 shows a dry fire trigger device and lower receiver in an initial rest position according to one embodiment of the disclosure.

FIG. 10 shows the dry fire trigger device 10 installed in the magazine well 46 in an initial rest position. In the rest position, the hammer 22 is in a cocked position such that the trigger 48 retains the hammer 22.

Figure 11:
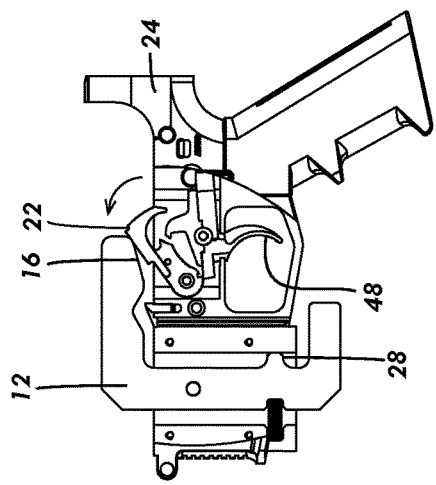
FIG. 11 shows a dry fire trigger device and lower receiver in a fired position according to one embodiment of the disclosure.

The lower receiver 24 is fired when a user pulls the trigger 48 thereby releasing the hammer 22. As shown in FIG. 11, when the dry fire trigger device 10 is installed in the lower receiver 24, the released hammer 22 contacts the upper hammer contact portion 16 of the dry fire trigger device 10, which prevents the hammer 22 from contacting and causing damage to the lower receiver 24. The lever stop 28 of the lever 12 contacts the lever housing 14 and prevents the lever 12 from further moving when the hammer 12 contacts the upper hammer contact portion 16 of the hammer 22.

Figure 12:
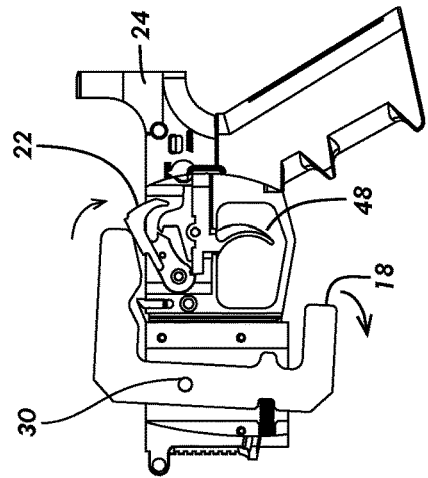
FIG. 12 shows a dry fire trigger device and lower receiver in a reset position according to one embodiment of the disclosure.

After the lower receiver 24 has been dry fired, the dry fire trigger device 10 is configured to reset the hammer 22 to the initial rest position where the hammer 22 is retained by the trigger 48. Referring to FIG. 12, a user removes a finger from the trigger 48 and presses the lower reset portion 18 of the lever 12 thereby pivoting the lever 12 about the pivot bore 30 engaged with the pivot projection 44 of the lever housing 14. After the dry fire trigger device 10 resets the hammer 22 to its initial position engaged with the trigger 48, the spring 34 forces the lever 12 back to its initial position such that the hammer contact portion 16 is positioned adjacent the hammer 22.

While the above description provides for a single lever 12 with a lower reset portion 18 that the user pushes to return the hammer 22 to its initial position, it is also understood that the dry fire trigger device may include various other mechanical linkages that would enable the user to reset the hammer 22 of the lower receiver. For example, additional linkages may be provided that would allow a user to pull the lower reset portion 18 to reset the hammer 22 such that the lower reset portion 18 operates as a second trigger. Alternatively, while reference is made to a lever pivotally engaging the hammer, it is also understood that the hammer contact portion 16 may slideably engage the hammer 22 instead of pivoting about the pivot bore 30. For example, linkages may be provided that enable the hammer contact portion 16 to slide in a substantially lateral direction relative to the hammer 22.

In an alternative embodiment, the dry fire trigger device 10 is configured to rapidly reset the hammer of a firearm when dry firing the firearm, such as when dry firing an automatic weapon or rapidly firing a semi-automatic firearm. As referred to herein, an automatic firearm refers to a firearm that will continue to discharge so long as the trigger is pressed and held. An example of a suitable automatic firearm is the M16 rifle, which may include a selector switch to change the rifle from automatic to semi-automatic fire. When in use with an automatic firearm or rapid firing of a semi-automatic firearm, the dry fire trigger device 10 is preferably configured to provide rapid return of the hammer 22 to its initial position.

FIGS. 13-16 illustrate a motorized embodiment of the dry fire trigger device 52 including a lever 54, a push rod 56, and a motor 58. The lever 54 is hingedly secured to the motorized dry fire trigger device 52 and configured to contact the hammer 22 of a firearm in which the motorized dry fire trigger device 52 is installed.

Figure 13:
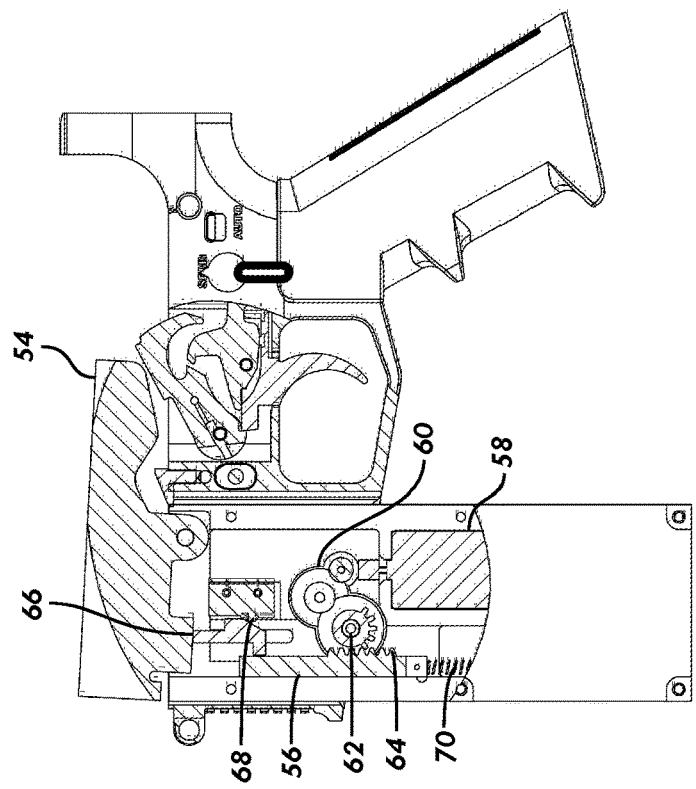

FIG. 13 illustrates the motorized dry fire trigger device 52 in a start position wherein the lever 54 positioned adjacent the hammer 22 of the firearm is in a cocked position as described above. The motor 58 is secured to one or more drive gears 60 and a partial tooth drive gear 62. The partial tooth drive gear 62 includes a plurality of teeth that extend only partially around the partial tooth drive gear 62, such as around approximately $1/3^{rd}$ the proximity of the partial tooth drive gear 62. The partial tooth drive gear 62 is positioned adjacent the push rod 56, which includes a rack 64 secured thereto.

Figure 14:
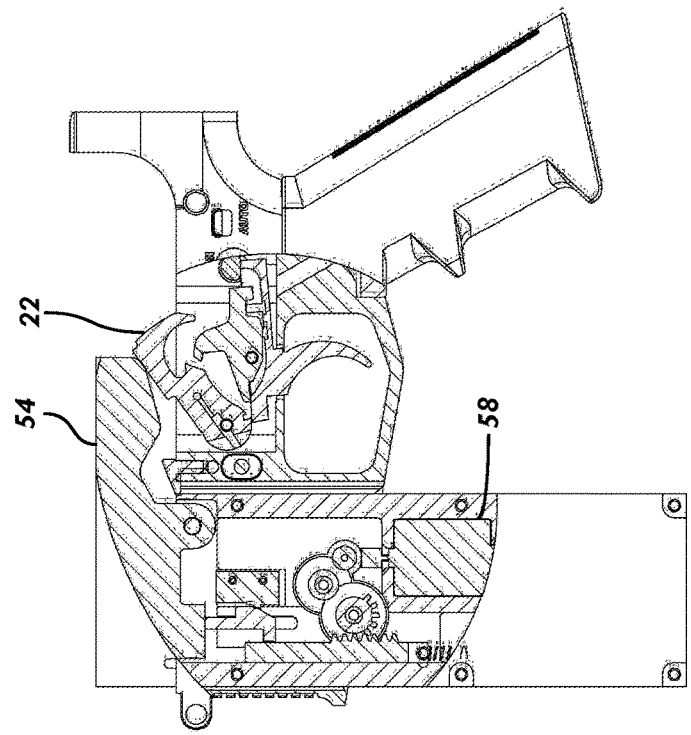
FIGS. 13-16 illustrate a motorized dry fire trigger device according to one embodiment of the disclosure.

Referring now to FIG. 14, when the hammer 22 is released the hammer 22 contacts the lever 54, thereby causing the lever 54 to pivot. As the lever 54 pivots, a slider 66 adjacent the lever 54 is forced downward by the lever 54 such that the slider 66 contacts a switch 68. The switch 68 is in electrical communication with the motor 58 such that when the switch 68 is contacted by the slider 66, the motor 58 is activated.

Figure 15:
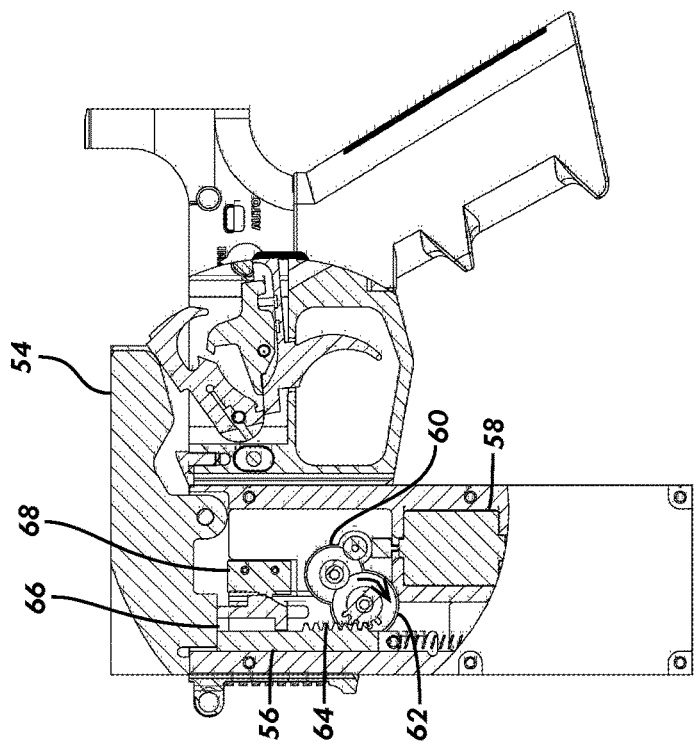
Figure 17:
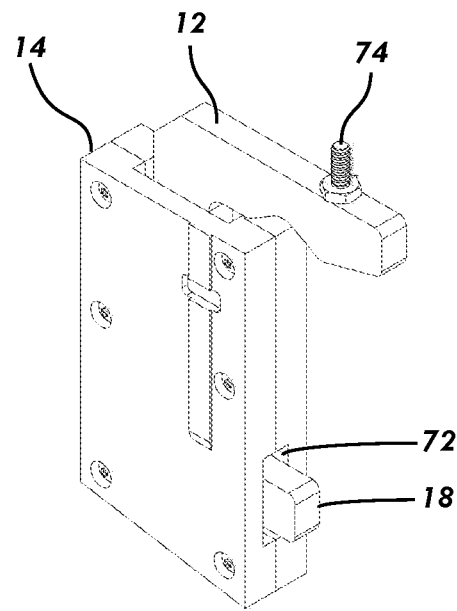
FIGS. 17-20 illustrate a dry fire trigger device having an elongated housing according to one embodiment of the disclosure.
Figure 18:
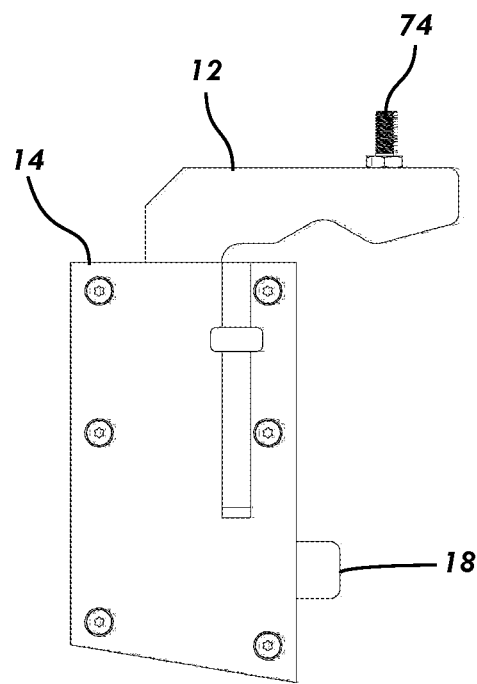
Figure 19:
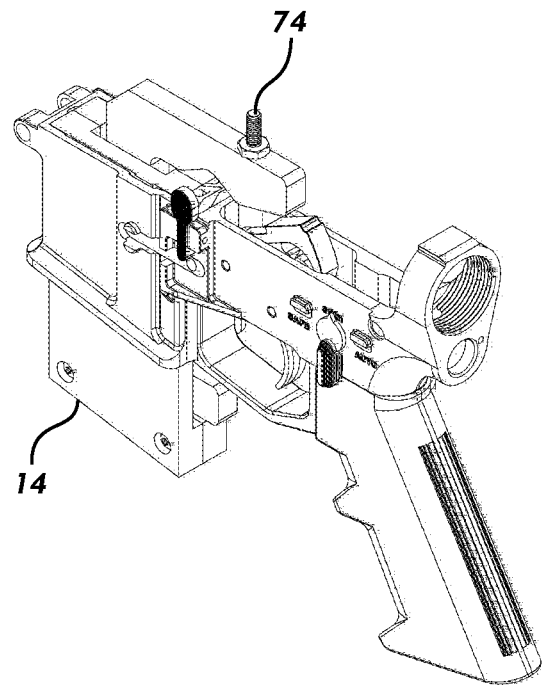
Figure 20:
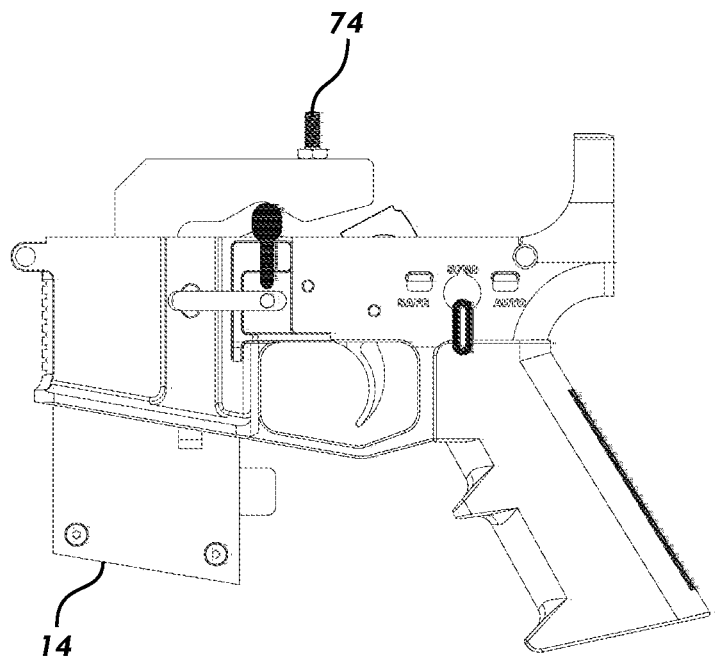

When the motor 58 is activated, the motor 58 drives the one or more drive gears 60, which rotate the partial tooth drive gear 62 (FIG. 15). The partial tooth drive gear 62 engages the rack 64 of the push rod 56 and urges the push rod 56 upward towards the lever 54 until the push rod 56 contacts the lever 54.

Figure 16:
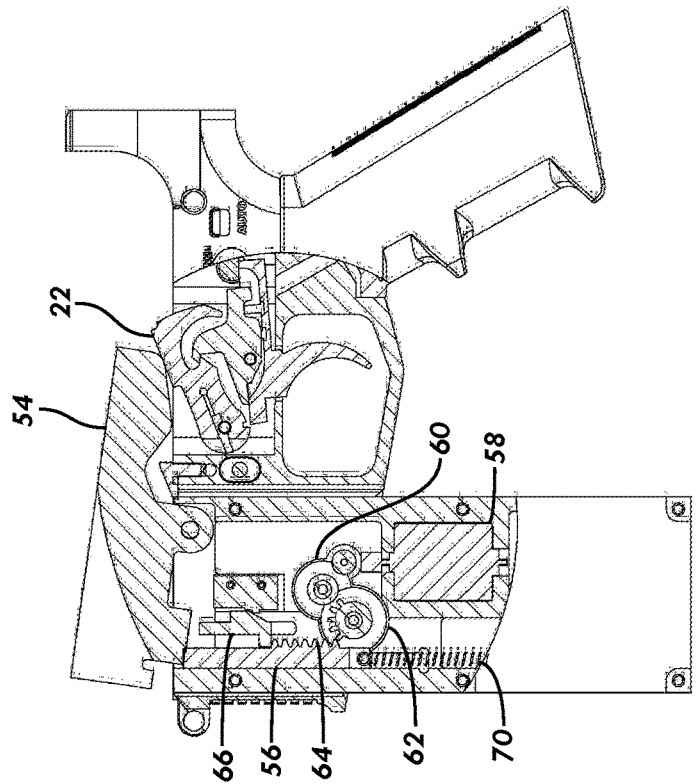

As shown in FIG. 16, upon the pushrod 56 contacting the lever 54, the lever 54 is pivoted such that the lever contacts the hammer 22 and thereby returns the hammer 22 to the cocked position. When the pushrod 56 reaches an upward position upon contacting the lever 54, the push rod 56 contacts the slider 66, thereby urging the slider 66 upward such that the slider 66 disengages the switch 68 which deactivates the motor 58. Further, when the pushrod 56 is in the upward position the rack 64 disengages from the partial tooth drive gear 62. A spring 70 secured to the pushrod 56 pulls the pushrod 56 to a lower position to substantially reset the pushrod 56.

In operation, the motorized dry fire trigger device 52 is configured to contact the hammer 22 of a firearm and automatically reset the hammer 22 to its initial cocked position upon dry firing the firearm. The motorized dry fire trigger device 52 may be used with either an automatic or semi-automatic firearm to reset the hammer 22 to its initial cocked position without requiring the user to manually reset the hammer 22 to the cocked position. The motorized dry fire trigger device 52 is configured to cycle at a rate of from about 30 rounds per minute to a rate of about 300 rounds per minute. Further, in some embodiments, a rate of the motorized dry fire trigger device 52 may be adjustable, thereby allowing a user to adjust a rate at which the lower receiver 24 is dry fired.

The dry fire trigger device 52 may be configured to operate in conjunction with an electronic trainer, such as a laser or other device for training with a firearm. For example, the dry fire trigger device 52 may include a switch or other actuator that activates a laser of an electronic trainer when a firearm is dry fired. An optional set screw 74 (FIGS. 17-20) may be threadably attached to the lever 12, wherein the set screw 74 is configured to contact a portion of an upper receiver of a firearm such that a vibration is induced in the firearm. For example, the set screw 74 may contact an underside of a charging handle or other portion of the firearm to transmit a vibration to the firearm. The set screw 74 may be preferable wherein an electronic trainer is used that is activated by a vibration induced in the firearm related to a trigger pull of the firearm.

Figure 6:
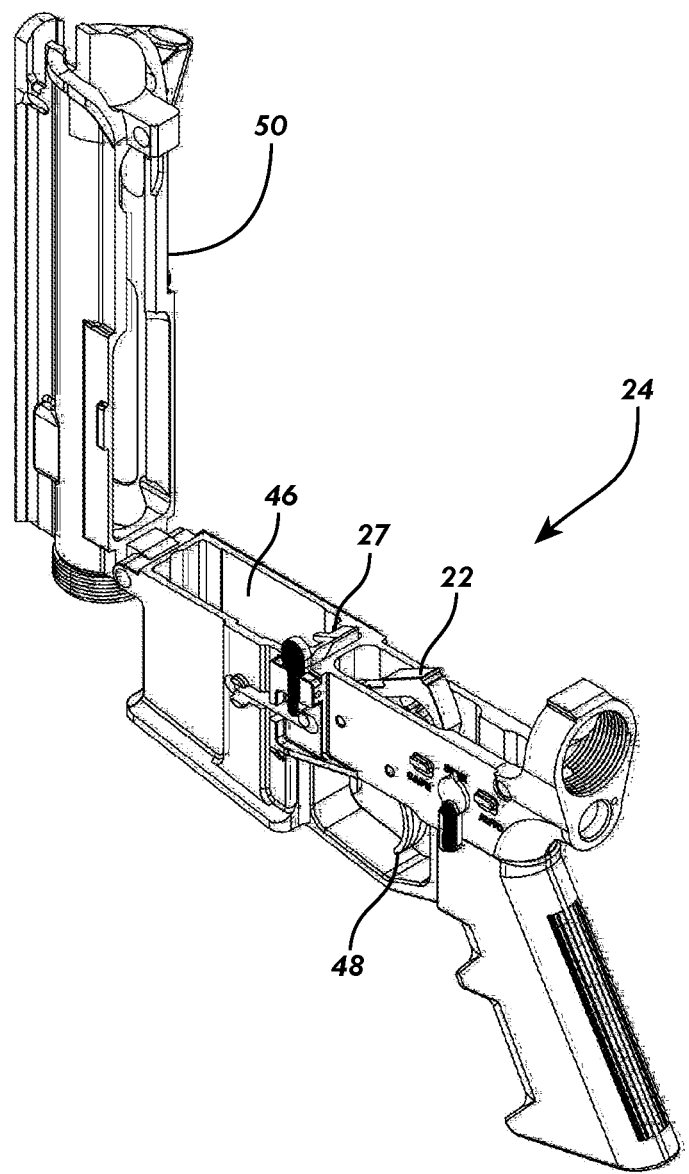
FIG. 6 shows a lower receiver of a weapon according to one embodiment of the present disclosure.

In a typical lower receiver, such as the lower receiver illustrated in FIG. 6, dry firing the lower receiver 24 without an upper receiver attached may result in damage to the lower receiver 24, such as damage caused by the hammer 22 contacting the bolt catch 27 or other parts of the lower receiver 24. Therefore, it is generally advised that a lower receiver not be dry fired without an upper receiver attached to the lower receiver 24. Further, during discharge of the firearm, the hammer 22 is generally returned to its initial position as a bolt carrier of the firearm cycles. Cycling of the bolt carrier occurs as a result of forces generated during discharge of a round of ammunition, such as by gases or kinetic energy created during discharge of the round of ammunition. However, when dry firing a firearm, these forces are not created as no round is actually discharged, and therefore a user must manually reset the hammer to its initial position. This requires a user to lift the user's head off of the lower receiver 24 and apply substantial manual force to reset the hammer, making rapid dry firing of the firearm difficult.

The dry fire trigger device 10 of the present disclosure advantageously enables a user to dry fire a lower receiver 24 of a firearm without damaging the firearm. The hammer 22 contacts the lever 12, which is preferably made of a polymer of other like material, and the dry fire trigger device 10 prevents the hammer 22 from contacting portions of the lower receiver 24, thereby preventing damage to both the hammer 22 and the lower receiver 24. Further, the dry fire trigger device 10 is configured to readily reset a hammer 22 of the lower receiver 24 to its initial position without requiring the user to lift the user's head from the lower receiver 24. By allowing a user to dry fire the lower receiver 24 of the firearm without the attached upper receiver, the user may practice learning a feel of a trigger of the lower receiver without assembling the complete firearm. Finally, the dry fire trigger device 10 disclosed herein is configured to engage a trigger, hammer, and other components of a fire control group of a lower receiver such that a feel of pulling the trigger is the same both when dry firing the lower receiver 24 with the dry fire trigger device 10 and when live firing the lower receiver 24 and firearm.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A dry fire trigger device for dry firing a lower receiver of a firearm having a magazine well, a trigger, and a hammer, the dry fire trigger device comprising:
    a lever housing shaped to engage the magazine well of the lower receiver;
    a lever movably secured to the lever housing, the lever including a hammer contact portion shaped to contact the hammer of the lower receiver;
    a reset portion in communication with the hammer contact portion of the lever;
    wherein the hammer contact portion is adjacent the hammer of the lower receiver when the device is secured in the magazine well of the firearm;
    wherein in a first position the hammer contacts the hammer contact portion of the lever when the trigger is pulled; and
    wherein when a user engages the reset portion, the lever is moved to a second position to re-cock the hammer of the lower receiver.

2. The dry fire trigger device of claim 1, wherein the reset portion is positioned adjacent the trigger of the lower receiver when the dry fire trigger device is secured in the magazine well of the firearm.

3. The dry fire trigger device of claim 1, wherein the lever is pivotally attached to the lever housing at a pivot projection of the housing such that the lever pivots with respect to the housing.

4. The dry fire trigger device of claim 3 further comprising a spring attached at a first end to the lever housing and at a second end to the lever, wherein the spring urges the lever to the first position such that the lever returns to the first position after substantially re-cocking the hammer of the lower receiver.

5. The dry fire trigger device of claim 1, the hammer contact portion of the lever further comprising a bolt catch notch formed therein.

6. The dry fire trigger device of claim 1, the lever housing further comprising a magazine release notch for engaging a magazine release of the lower receiver.

7. The dry fire trigger device of claim 1, wherein the lever housing is formed of a first block half and a second block half.

8. The dry fire trigger device of claim 1, wherein the lever housing and lever are formed of a hardened polymer.

9. The dry fire trigger device of claim 1 further comprising a chamber flag attached to the lever housing, wherein the chamber flag visually indicates that the dry fire trigger device is installed in the lower receiver of the firearm.

10. The dry fire trigger device of claim 2, wherein the housing is substantially elongate such that a lower portion of the lever is substantially contained within the housing and the reset portion extends through an aperture of the housing.

11. The dry fire trigger device of claim 1 further comprising a set screw attached to the lever, wherein the set screw is configured to contact a portion of the firearm when the trigger is pulled to induce a vibration in the firearm.

12. A dry fire trigger device for dry firing a lower receiver of a firearm having a magazine well, a trigger, and a hammer, the dry fire trigger device comprising:
 a lever housing shaped to engage the magazine well of the lower receiver; a lever pivotally secured to the lever housing, the lever including:
  a hammer contact portion shaped to contact the hammer of the lower receiver,
  a lower reset portion positioned adjacent the trigger of the lower receiver when the dry fire trigger device is secured in the magazine well of the firearm, and a bolt catch notch formed in the hammer contact portion of the lever;
 a spring attached at a first end to the lever housing and at a second end to the lever,
  wherein the spring urges the lever to the first position such that the lever returns to the first position after substantially re-cocking the hammer of the lower receiver;
 wherein the hammer contact portion is adjacent the hammer of the lower receiver when the device is secured in the magazine well of the firearm, and
 wherein in a first position the hammer contacts the hammer contact portion of the lever when the trigger is pulled and further wherein when a user engages the lower reset portion, the lever is moved to a second position to re-cock the hammer of the lower receiver.

* * * * *